Dec. 25, 1951 LA MAR S. COOPER 2,580,219
CONTROLLED HUMIDITY REFRIGERATOR
Filed May 25, 1948
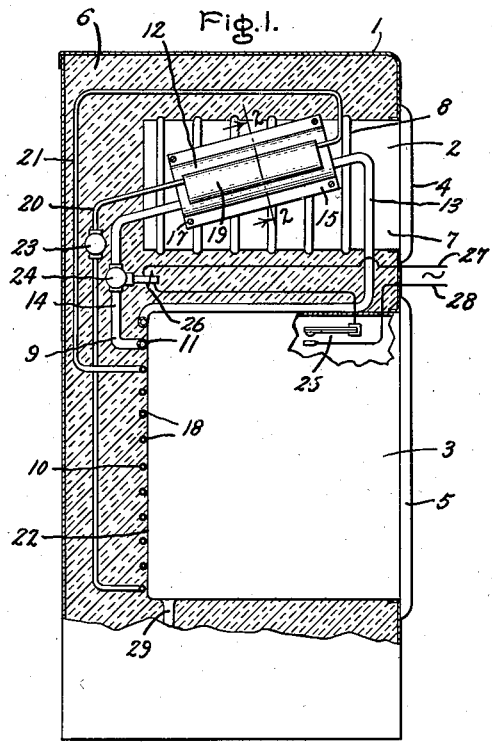
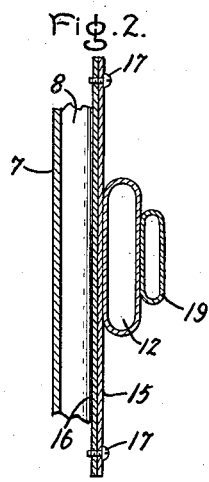
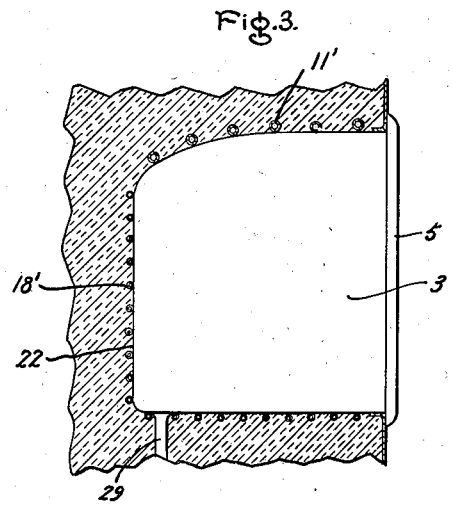
Inventor:
La Mar S. Cooper,
by William G. Edwards, Jr.
His Attorney.

Patented Dec. 25, 1951

2,580,219

UNITED STATES PATENT OFFICE 2,580,219

CONTROLLED HUMIDITY REFRIGERATOR

La Mar S. Cooper, Cedar Rapids, Iowa, assignor to General Electric Company, a corporation of New York Application May 25, 1948, Serial No. 29,124

10 Claims. (Cl. 62—125)

My invention relates to refrigerators and more particularly to refrigerators employing a plurality of evaporators.

It is generally desirable to provide in household refrigerators a food storage compartment in which the atmosphere is maintained at a relatively high humidity to prevent the drying out of food stored therein. Where refrigeration is provided of such a nature as to secure a desirable humidity under low ambient temperature and no load conditions, it is sometimes found that under higher ambient conditions or under a heavy food or door opening load an excessively high humidity may develop in the food storage compartment. Thus a refrigerating arrangement which maintains an atmosphere of the desired humidity in the food storage compartment when the ambient temperature is in the order of 70 degrees F. and when there are no door openings or added food load may result in an excessively high humidity and in excessive condensation of water vapor or "sweating" in the food storage compartment when the ambient temperature is in the order of 100 degrees F. and when there are frequent door openings and heavy food load. I have found that this condition can be avoided and a desirable humidity maintained under varying load and ambient temperature conditions by providing a plurality of properly disposed evaporators of different refrigerating capacities and operating characteristics for refrigerating the food storage compartment.

It is an object of my invention to provide an improved refrigerator which maintains high relative humidity in a food storage compartment under no load, low ambient temperature conditions and which avoids excessive humidity under heavy load, high ambient temperature conditions.

It is another object of my invention to provide an improved refrigerator including two evaporators wherein one of the evaporators supplies refrigeration during no load, low ambient temperature conditions and the other evaporator automatically becomes effective during heavy load, high ambient temperature conditions.

It is a further object of my invention to provide a refrigerator including a plurality of secondary refrigerating systems for refrigerating a food storage compartment and including an improved arrangement of the secondary refrigerating systems.

Further objects and advantages of my invention will become apparent as the following description proceeds and the features of novelty which characterize my invention will be pointed out with particularity in the claims annexed to and forming part of this specification.

For a better understanding of my invention reference may be had to the accompanying drawing in which Fig. 1 is an elevation view, partly in section, of a refrigerator cabinet illustrating my invention; Fig. 2 is a sectional view along the line 2—2 in Fig. 1; and Fig. 3 shows a portion of a refrigerator cabinet illustrating a modified arrangement.

Referring to the drawing, there is shown a refrigerator cabinet 1 including a freezing compartment 2, and a food storage compartment 3. Access openings for the compartments are closed by doors 4 and 5, respectively. Suitable insulating material 6 of low thermal conductivity is arranged within the cabinet 1 about the compartments 2 and 3. The freezing compartment 2 is formed by a metal liner 7, and this compartment is refrigerated by a primary evaporator formed by tubing 8, which is secured to the exterior of the liner 7. The primary evaporator operates at a temperature in the neighborhood of 0 degrees F.

Two secondary refrigerating systems 9 and 10 are provided for cooling the food storage compartment 3. The secondary refrigerating system 9 includes an evaporating portion or evaporator 11 and a condensing portion or condenser 12, connected in closed circuit relationship by conduits 13 and 14. A charge of volatile refrigerant is placed within the closed secondary system, and this refrigerant is vaporized in the evaporating portion 11 by heat withdrawn from the food storage compartment 3. The vaporized refrigerant passes through the conduit 13 to the condensing portion 12, where it is condensed, and the liquid refrigerant flows through the conduit 14 to the evaporating portion 11. The condensing portion 12 is arranged in heat exchange relationship with the primary evapoartor formed by the tubing 8, and heat is transferred from the secondary refrigerant to the primary evaporator to effect the condensation of the refrigerant in the condensing portion 12. For convenience in assembling the secondary systems and to give a greater area of heat exchange contact the condensing portion 12 is secured by brazing or other suitable securing arrangement to a metal plate 15, as shown in Fig. 2. A companion metal plate 16 is similarly secured to the tubing 8. A heat conducting filler is placed between the plates 15 and 16 and the plates are held in heat exchange relationship by screws or other fastening devices 17.

The secondary refrigerating system 10 similarly includes an evaporating portion or evaporator 18 and a condensing portion or condenser 19 connected in closed circuit relationship by conduits 20 and 21. The condensing portion 19 is secured in heat exchange relationship with the condensing portion 12 of the secondary refrigerating system 9. The plate 15 on one side and the condensing portion 19 on the other side reinforce the condensing portion 12.

The evaporating portion 18 is secured by brazing or other suitable method to the exterior of the liner 22 of the food storage compartment 3. This evaporating portion 18 is secured to the lower portion of the liner and may extend only along the back of the liner or along the back and sides. The evaporating portion 18 is formed of tubing of relatively small diameter so that the capacity of the secondary refrigerating system 10 is limited. The evaporating portion 18 is of such size that the refrigerating capacity of the secondary system 10 is sufficient to cool the food storage compartment 3 to about 40 degrees F. only under no load conditions and where the ambient temperature does not exceed 70 degrees F. This evaporator is operated at a temperature above the freezing point of water. If desired, a conventional pressure static valve 23, which is responsive to the pressure of the refrigerant in the evaporating portion 18, may be included in the line 20 to cut off the flow of liquid refrigerant to the evaporating portion 18 whenever the temperature of the evaporating portion reaches a predetermined minimum. Since this evaporator is operated at a temperature above the freezing point of water and since it supplies the total refrigeration under low ambient temperature and no load conditions, the rate of moisture condensation from the atmosphere within the food storage compartment 3 is such that a satisfactory high humidity atmosphere is maintained in the food storage compartment.

The evaporating portion 11 of the secondary refrigerating system 9 is secured to the exterior of the liner 22 along the upper portion of the food storage compartment 3. The evaporating portion 11 is formed of tubing of substantially larger diameter than that utilized for the evaporating portion 18, and this evaporating portion has a greater refrigerating capacity than the evaporating portion 18. Similarly, the condensing portion 12 of the secondary refrigerating system 9 is substantially larger than the condensing portion 19 of the secondary refrigerating system 10. Moreover, the condensing portion 12 is in immediate heat exchange relationship with the primary evaporator 8. The evaporating portion 11 includes a smaller number of turns of tubing than the evaporating portion 18, and because of the larger diameter tubing employed, it operates at a temperature substantially lower than that of the evaporating portion 18. This temperature is below the freezing point of water. The evaporating portion 11 is intended to supply refrigeration for the food storage compartment 3 when the ambient temperature is high, for example, in the order of 100 degrees F., and where there are frequent door openings or where a substantial food load is placed in the compartment 3. The operation of the high capacity evaporating portion 11 below the freezing point of water avoids an excessively high humidity in the food storage compartment 3 under these conditions of high ambient temperature and heavy load, and accordingly any tendency toward "sweating" in the compartment is minimized.

The particular arrangement of the evaporating portions 18 and 11 is also directed toward insuring satisfactory conditions in the food storage compartment. Thus the evaporating portion 18 is located at the lower portion of the liner and thereby causes a minimum convection within the food storage compartment. Also, since the evaporating portion 18 operates not far below the actual temperature maintained in the food storage compartment and covers a substantial area of the liner, there is a low temperature gradient from the top to the bottom of the food storage compartment. The evaporating portion 11, on the other hand, is arranged along the upper portion of the liner 22 and covers a relatively small area of the liner. The resulting cooling of the air at the top of the compartment by this evaporating portion, which operates below the freezing point of water, results in a maximum convection within the compartment because of the tendency of this low temperature air to descend to the bottom of the compartment. Because of the increased circulation of air a low temperature gradient from top to bottom of the compartment is also achieved by the evaporating portion 11, even though it operates at a relatively low temperature.

In Fig. 1 the evaporating portion 11 is arranged along the upper portion of the back of the liner 22 and the evaporating portion 18 is arranged along the lower portion of the back of this liner. Each of the evaporating portions may, of course, also extend along one or both sides of the liner. In the alternative arrangement shown in Fig. 3 the evaporating portion 11' is arranged entirely along the top of the liner 22. The evaporating portion 18' extends along the back and also along the bottom of this liner. In this form the evaporating portion 18' may also extend along one or both sides of the liner.

A normally-closed, solenoid-operated valve 24 is provided in the conduit 14 for controlling the flow of liquid refrigerant to the evaporating portion 11. The operation of the valve 24 is controlled by a thermostat 25, which is located within the food storage compartment adjacent the top of the access opening of this compartment. The thermostat is thus affected promptly by door openings, which result in an increase in the temperature of the air in this region of the food storage compartment. The thermostat 25 is arranged to close the circuit of a coil 26, which operates the solenoid valve 24, power for the coil 26 being supplied from any suitable source through lines 27 and 28. The thermostat 25 has been illustrated in the form of a bimetallic strip, but it is obvious that any other suitable form, such as a thermostatic bulb connected to a bellows for controlling the circuit of the coil 26, could be employed.

Where the ambient temperature is in the order of 70 degrees F. and there are no door openings nor any food being added to the compartment 3, the secondary system 10, through its evaporating portion 18, is sufficient to refrigerate the food storage compartment to a temperature in the order of 40 degrees F. The evaporating portion 18, as pointed out above, has a large surface area and therefore can operate above the freezing point of water, and a desirably high humidity is maintained in the food storage compartment 3. Should the ambient temperature rise to say 100 degrees F., and particularly where there are frequent door openings or where additional food is placed in the food storage compartment, the supplying of refrigeration for the compartment by the evaporating portion 18 might result in excessive humidity conditions and in "sweating" within the compartment 3. In order to avoid such excessive humidity the secondary refrigerating system 9 and its evaporating portion 11 are brought into operation under such conditions. Thus an increase in ambient temperature, exceeding the capacity of the evaporating portion 18, or door openings or additional food load results in an increase in the temperature of the air within the compartment 3 and particularly in the region adjacent the top of the access opening of this compartment. The thermostat 25 then closes the circuit of the coil 26, opening the solenoid-operated valve 24. Liquid refrigerant is supplied to the evaporating portion 11, whose greater refrigerating capacity supplies the additional refrigeration to meet this increased demand.

The evaporating portion 11 operates below the freezing point of water and thereby minimizes any tendency toward excessive humidity conditions within the food storage compartment 3. Because of the operation of the evaporating portion 11 at a temperature below the freezing point of water, moisture in the air in the food storage compartment 3 condenses on the liner in the area of the evaporating portion 11. As the refrigeration continues, frost is formed on the liner in this area. When the temperature of the air in the food storage compartment has been reduced below the maximum for which the thermostat 25 is set, the valve 24 is closed preventing further supply of refrigerant to the evaporating portion 11. The frost then melts and the water flows down the back of the liner and is discharged from the food storage compartment 3 through a drain 29 into any suitable receptacle (not shown). Any excessive moisture present in the air within the food storage compartment because of door openings, placing of additional food load in the compartment, and high ambient temperature is thus removed from the compartment and excessive humidity in the compartment is avoided.

The arrangement of the condensing portions 12 and 19 relative to the tubing 8 of the primary evaporator affects the distribution of refrigerating load between the evaporating portions 11 and 18. As shown in Fig. 2 the condensing portion 12 of the secondary refrigerating system 9 is arranged adjacent the primary evaporator 8, while the evaporating portion 19 is arranged in heat exchange relationship with the condensing portion 12 and is spaced from the primary evaporator by the condensing portion 12. Thus when the secondary refrigerating system 10 alone is operating the entire capacity of the primary evaporator available for the secondary systems is devoted to the condensing portion 19. When the secondary refrigerating system 9 is operating there is an increase in the temperature of the condensing portion 12 and this higher temperature reduces the capacity of the condensing portion 19 and hence the refrigerating capacity of the evaporating portion 18. Accordingly, under the high ambient temperature and heavy load conditions which bring the secondary evaporating system 9 into operation the refrigerating effect of the evaporating portion 18 of the secondary refrigerating system 10 is reduced. Further, as the load increases the effect of the evaporating portion 18 progressively decreases because of the increasingly high temperature of the condensing portion 12 through which the secondary refrigerating system 10 obtains its refrigeration.

While I have shown and described specific embodiments of my invention I do not desire my invention to be limited to the particular constructions shown and I intend, by the appended claims, to cover all modifications within the spirit and scope of my invention.

What I claim as new and desire to secure by Letters Patent of the United States is:

1. Refrigerating apparatus including a cabinet having a food storage compartment, a first evaporator arranged at the lower portion of said compartment, a second evaporator arranged at the upper portion of said compartment, means including a refrigerant condensing unit for supplying refrigerant to said first evaporator for operation at a temperature above the freezing point of water to maintain a high relative humidity in said compartment and for supplying refrigerant to said second evaporator for operation at a temperature below the freezing point of water to prevent excessively high humidity in said compartment, control means for rendering said second evaporator normally inoperative, and means responsive to a predetermined temperature of the air within said compartment for actuating said control means to render said second evaporator operative.

2. Refrigerating apparatus including a cabinet having a food storage compartment, a liner for said food storage compartment, a first evaporator secured to the lower portion of said liner, a second evaporator secured to the upper portion of said liner, means including a refrigerant condensing unit for supplying refrigerant to said first evaporator for operation at a temperature above the freezing point of water to maintain a high relative humidity in said compartment, means including a refrigerant condensing unit for supplying refrigerant to said second evaporator for operation at a temperature below the freezing point of water for preventing excessively high humidity in said compartment, and means responsive to a predetermined temperature of the air within said compartment for rendering said second evaporator effective.

3. Refrigerating apparatus including a cabinet having a food storage compartment, a liner for said food storage compartment, a first secondary refrigerating system having an evaporating portion secured to the lower portion of said liner, a second secondary refrigerating system including an evaporating portion secured to the upper portion of said liner, means for supplying refrigerant to said first-mentioned evaporating portion for operation at a temperature above the freezing point of water, means for supplying refrigerant to said second-mentioned evaporating portion for operation at a temperature below the freezing point of water, a valve in said second secondary system for controlling the flow of refrigerant therein, and means responsive to a predetermined temperature within said compartment for actuating said valve.

4. Refrigerating apparatus including a cabinet having a food storage compartment, a liner for said food storage compartment, a primary refrigerating system including an evaporator, two secondary refrigerating systems, each of said secondary systems including an evaporating portion and a condensing portion, one of said secondary systems having its evaporating portion secured to the upper portion of said liner and its condensing portion arranged in heat exchange relationship with the primary evaporator, the other of said secondary systems having its evaporating portion secured to the lower portion of said liner and its condensing portion secured in heat exchange relationship with the condensing portion of said one of said secondary systems, means responsive to a predetermined maximum temperature within said compartment for initiating refrigeration by said other of said secondary systems.

5. Refrigerating apparatus including a cabinet having a food storage compartment, a liner for said food storage compartment, a first evaporator secured to the lower portion of said liner, said evaporator including a substantial length of tubing of relatively small diameter, a second evaporator secured to the upper portion of said liner, said second evaporator including a smaller length of tubing of substantially greater diameter than said first evaporator, means including a refrigerant condensing unit for supplying refrigerant to said first evaporator for operation at a temperature above the freezing point of water to maintain a high relative humidity in said compartment and for supplying refrigerant to said second evaporator for operation at a temperature below the freezing point of water for preventing excessively high humidity in said compartment, and means responsive to a predetermined maximum temperature within said compartment for rendering said second evaporator effective.

6. Refrigerating apparatus including a cabinet having a food storage compartment, a liner for said food storage compartment, a first evaporator arranged in heat exchange contact with a substantial area of the lower portion of said liner, a second evaporator arranged in heat exchange contact with a small area of the upper portion of said liner, means including a refrigerant condensing unit for supplying refrigerant to said first evaporator for operation at a temperature above the freezing point of water whereby a low temperature gradient and minimum convection are maintained in said compartment by said evaporator, means including a refrigerant condensing unit for supplying refrigerant to said second evaporator for operation at a temperature below the freezing point of water whereby a low temperature gradient and maximum convection are maintained in said compartment by said second evaporator, and means responsive to a predetermined temperature of the air within said compartment for rendering said second evaporator effective.

7. Refrigerating apparatus including a cabinet having a food storage compartment, said compartment including a door opening, a first evaporator arranged at the lower portion of said compartment, a second evaporator arranged at the upper portion of said compartment, means including a refrigerant condensing unit for supplying refrigerant to said first evaporator for operation at a temperature above the freezing point of water to maintain a high relative humidity in said compartment, means including a refrigerant condensing unit for supplying refrigerant to said second evaporator for operation at a temperature below the freezing point of water to prevent excessively high humidity in said compartment, and means responsive to a predetermined temperature of the air within said compartment adjacent the top of said door opening for rendering said second evaporator effective.

8. Refrigerating apparatus including a cabinet having a food storage compartment, a liner for said food storage compartment, a primary refrigerating system including a primary evaporator, two secondary refrigerating systems, each of said secondary systems including an evaporating portion and a condensing portion, one of said secondary systems having its evaporating portion secured to the upper portion of said liner and its condensing portion arranged in heat exchange relationship with the primary evaporator, means responsive to the temperature of the air in said compartment for initiating flow of refrigerant to said evaporating portion, the other of said secondary systems having its evaporating portion secured to the lower portion of said liner and having its condensing portion secured in heat exchange relationship with the condensing portion of said one of said secondary systems whereby when refrigeration is initiated in said one of said secondary systems the effectiveness of said other of said secondary systems is reduced.

9. The method of maintaining desirable humidity conditions in a food storage compartment which comprises employing two evaporators for refrigerating the compartment, operating one of said evaporators at a temperature above the freezing point of water, operating the other of said evaporators at a temperature below the freezing point of water, and placing said other of said evaporators in operation only upon the occurrence of a predetermined maximum temperature of the air within said compartment.

10. The method of maintaining desirable humidity conditions in a food storage compartment which comprises employing two evaporators for refrigerating the compartment, operating one of said evaporators at a temperature above the freezing point of water, operating the other of said evaporators at a temperature below the freezing point of water, placing said other of said evaporators in operation only upon the occurrence of a predetermined maximum temperature of the air within said compartment, allowing said other of said evaporators to defrost during its idle periods, and draining from said compartment water resulting from defrosting.

LA MAR S. COOPER.

REFERENCES CITED

The following references are of record in the file of this patent:

UNITED STATES PATENTS

| Number | Name | Date |
| --- | --- | --- |
| 1,954,148 | Smith | Apr. 10, 1934 |
| 2,073,008 | Haschke | Mar. 9, 1937 |
| 2,314,190 | Atchison | Mar. 16, 1943 |
| 2,315,460 | Steenstrup | Mar. 30, 1943 |
| 2,386,919 | Tobey | Oct. 16, 1945 |
| 2,416,777 | Schneller | Mar. 4, 1947 |
| 2,426,578 | Tobey | Aug. 26, 1947 |
| 2,436,945 | Sutton | Mar. 2, 1948 |
| 2,452,685 | Rudoy | Nov. 2, 1948 |
| 2,471,137 | Atchison | May 24, 1949 |